United States Patent [19] | [11] 4,104,966

Ackley, Jr. et al. | [45] Aug. 8, 1978

[54] CAPSULE ORIENTING AND TURNING APPARATUS

[75] Inventors: Charles E. Ackley, Jr., Philadelphia; Charles E. Ackley, Sr., Oreland, both of Pa.

[73] Assignee: R. W. Hartnett Company, Philadelphia, Pa.

[21] Appl. No.: 672,017

[22] Filed: Mar. 30, 1976

[51] Int. Cl.$^2$ ........................ B41F 17/36; B65G 47/24

[52] U.S. Cl. ........................................ 101/40; 101/426; 198/380; 198/384; 198/393; 221/173

[58] Field of Search .................. 101/40, 426; 198/380, 198/397, 400, 393, 384, 383; 221/156, 157, 158, 171, 172, 173

[56] References Cited

U.S. PATENT DOCUMENTS

| | | | |
|---|---|---|---|
| 2,785,786 | 3/1957 | Bartlett | 221/157 X |
| 3,176,825 | 4/1965 | Rudszinat et al. | 198/380 X |
| 3,871,295 | 3/1975 | Ackley | 101/40 X |

*Primary Examiner*—Clifford D. Crowder
*Attorney, Agent, or Firm*—Miller & Prestia

[57] ABSTRACT

Capsule orienting and turning apparatus and method for use in a wrap-around capsule printing procedure. Many capsules, randomly arranged in a hopper, are picked up in a rotary conveyor which arranges them first in an upright arrangement relative to the path of movement of the conveyor, some capsules arranged cap-up and some body-up, and novel gaging block means cooperates with air means to tilt the body portions of the bodies-up capsules in the machine direction while retaining the caps-up capsules substantially untilted so that all the cap portions can subsequently be shifted in a sidewise direction by a subsequent sideward-directed air suction means. Those capsules which are arranged caps-up are not affected by the first means because of a novel gaging block which prevents substantial tilting movement; the cap portions of these capsules are then drawn sidewise by a sidewardly-directed vacuum. In this way, the positions of the capsules are rectified, with all of the cap portions on one side of the predetermined path and all of the body portions on the other side of the predetermined path.

47 Claims, 16 Drawing Figures

CAPSULE ORIENTING AND TURNING APPARATUS

INTRODUCTION

This invention relates to a capsule orienting and turning apparatus for orienting and rectifying the positions of capsules which are originally disposed in a random arrangement in a container such as a hopper or the like. According to this invention, the capsules may be disposed in a uniform manner on a conveyor with all of the cap portions on one side and all of the body portions on the other, with the capsules having their axes disposed at approximately right angles to the path of the movement of the conveyor. In this position the capsules are arrayed in a preferred position for such subsequent processing operations as wrap-around printing, in which procedure the capsules are mounted in a rotatable position on individual carriers, and are passed in contact with a rotating printing roll which rotates at a speed which is considerably greater than the speed of movement of the capsule conveyor, thus causing each capsule to spin about its own axis during the printing process in a manner to apply special printing indicia having a large angle of wrap around the capsule.

BACKGROUND OF THE INVENTION

Marking machines of various types have been used commercially for marking indicia on a multiplicity of objects all of which have essentially the same size and shape. For example, machines have been successfully used for applying to relatively small articles such as pharmaceutical capsules, pellets, pills and the like, markings such as alphabetical letters, manufacturer's trademarks or other characterizing symbols for the purpose of ready identification. However, in most commercial procedures, particularly in the pharmaceutical industry, one of the primary objects of marking has been to prevent counterfeiting of products and of materials contained therein. In order to achieve this purpose, it has been highly desirable to apply an extremely accurate marking, having such a finely detailed character that counterfeiting is difficult or virtually impossible. In order to achieve this result, it has been considered necessary to avoid any relative movement between the article and the printing roll, and to avoid spinning of the pharmaceutical article about its axis.

DISCUSSION OF THE PRIOR ART

The Ackley U.S. Pat. No. 2,931,292 discloses an article marking machine of the type referred to above, which has been in successful commercial use for many years. Such an apparatus is particularly useful for handling objects which are symmetrical in form, such as pellets, pills or the like which are usually generally cylindrical or oval in shape.

Marking machines of the type disclosed in the Ackley Patent are ideally constructed for accepting large numbers of individual objects which are randomly arranged in a hopper, moving them along a conveyor belt and printing with extreme fineness and accuracy on one or both sides of the objects while holding the objects completely stationary in carriers which are specifically designed for the purpose.

In the pharmaceutical industry a physiologically active substance, usually in powdered form, is often placed into a capsule which is composed of two portions: a body portion of predetermined diameter and a cap portion of slightly larger diameter which slides telescopically over the body portion. In order to prevent the removal of a genuine pharmaceutical material from the capsule and to prevent substitution of a counterfeit material, such capsules have recently adopted a self-locking structure, such that the body portion and the cap portion are automatically locked to each other upon pushing the body portion onto the cap portion through a predetermined distance.

Accordingly, many capsules which are coming into extensive use at this time are not symmetrical in shape, because the cap portion necessarily has a larger diameter than the body portion.

In the cases of all such capsules, and in situations relating to many other pharmaceutical and other objects, it is often desirable to apply the printed indicia over a wide angle of surface curvature. For example, when the manufacturer has a long name, the name may be wrapped all the way around, or as much as 180° of the circumference of the capsule or other objects, or even more. This is effectively accomplished by causing the object to revolve about its axis or center as the indicia are printed on the surface of the object. When the object is supported in a manner to allow freedom of rotation, sufficient printing friction can be provided to eliminate any substantial slippage between the printing means and the surface printed upon.

The U.S. Pat. to Ackley No. 3,871,295 discloses a capsule orienting and turning apparatus and method of the type which is capable of accepting a multiplicity of capsules arranged at random in a hopper, and tilting and orienting the capsules so that they are delivered to a conveyor in an oriented condition, specifically in a condition where all of the cap portions are disposed toward one side of the conveyor and all of the body portions of the capsules are disposed toward the other side of the conveyor. The means disclosed in the aforesaid Ackley patent includes a positive flow of air which first tilts the bodies-up capsules in the machine direction, and a cross-wise air flow which subsequently swings all the cap portions of all of the capsules in a sideward direction with respect to the direction of their movement. Those capsules which were initially positioned with the caps up are not tilted in the machine direction by the first air current, because they are prevented from doing so by critically spaced stop means positioned immediately adjacent to their path of movement at the point where the air pressure is applied.

It has been found that in the use of a machine having pockets for a plurality of adjacent rows of capsules, problems arise in the operation of machines and methods of the prior art. It has been discovered that the unrestricted flow of air, producing air currents and eddy currents, which flow to neighboring capsule rows on one side or even to both sides, tends to interfere with the reliability of operation in the adjacent or neighboring rows of capsules, thus producing malfunctions from place to place. Further, it has been found that a critically controlled means in the form of a gaging block having a novel construction and operation, is highly instrumental in establishing and maintaining a particularly high degree of reliability in the initial capsule handling functions of the apparatus.

OBJECTS OF THE INVENTION

It is accordingly an object of this invention to provide an automatic machine which can accept for mass production large numbers of capsules which are arranged completely at random in a container such as a feed hopper for example, and which can sort out and orient the capsules so that they are spaced apart uniformly from each other and so that they can be "rectified" or "oriented", both of which terms as used in connection with this invention means arranging all of the cap portions toward one side of the predetermined path of movement of the capsules, and arranged all of the body portions toward the other side of such path.

It is another object of this invention to provide an apparatus of this type which picks up the capsules from the hopper with a high degree of efficiency and reliability, which arranges them in an upright position with respect to the path of movement, and which then shifts them to a transverse position with respect to the path of movement and deposits them in a rectified condition on a conveyor belt, with the axes of the capsules substantially crosswise to the direction of movement of the conveyor belt, in a condition ideally adapted for wrap-around printing.

It is another object of this invention to provide a capsule orienting apparatus of the type described, wherein multiple rows of capsules may be handled in a side by side and substantially parallel manner, with the handling operations for each individual row of capsules being substantially independent of its neighbors and free of disturbance thereof.

Still another object of this invention is to provide a capsule orienting apparatus of the type described, wherein positive handling techniques are applied to the capsules in a manner to cause a tilting movement of the bodies-up capsules, along a line disposed generally in the machine direction, while causing the caps-up capsules to travel concurrently with such tilting movement without performing any substantial tilting movement themselves, followed by the concurrent sidewise swinging movement of the cap portions of the capsules that have been tilted, and the cap portions of the capsules which have not been tilted as well, causing all of such cap portions to be swung in a sideward direction to arrange all of the caps so that they face toward one side of the machine direction, and to arrange all of the body portions so that they face toward the opposite side with respect to the machine direction.

Other objects and advantages of this invention, including the simplicity and economy of the same, and the ease with which it may be adapted to the high speed mass production of wrap-around printed capsules, will readily become apparent hereinafter and in the drawings.

DRAWINGS

Figures 1, 1A:
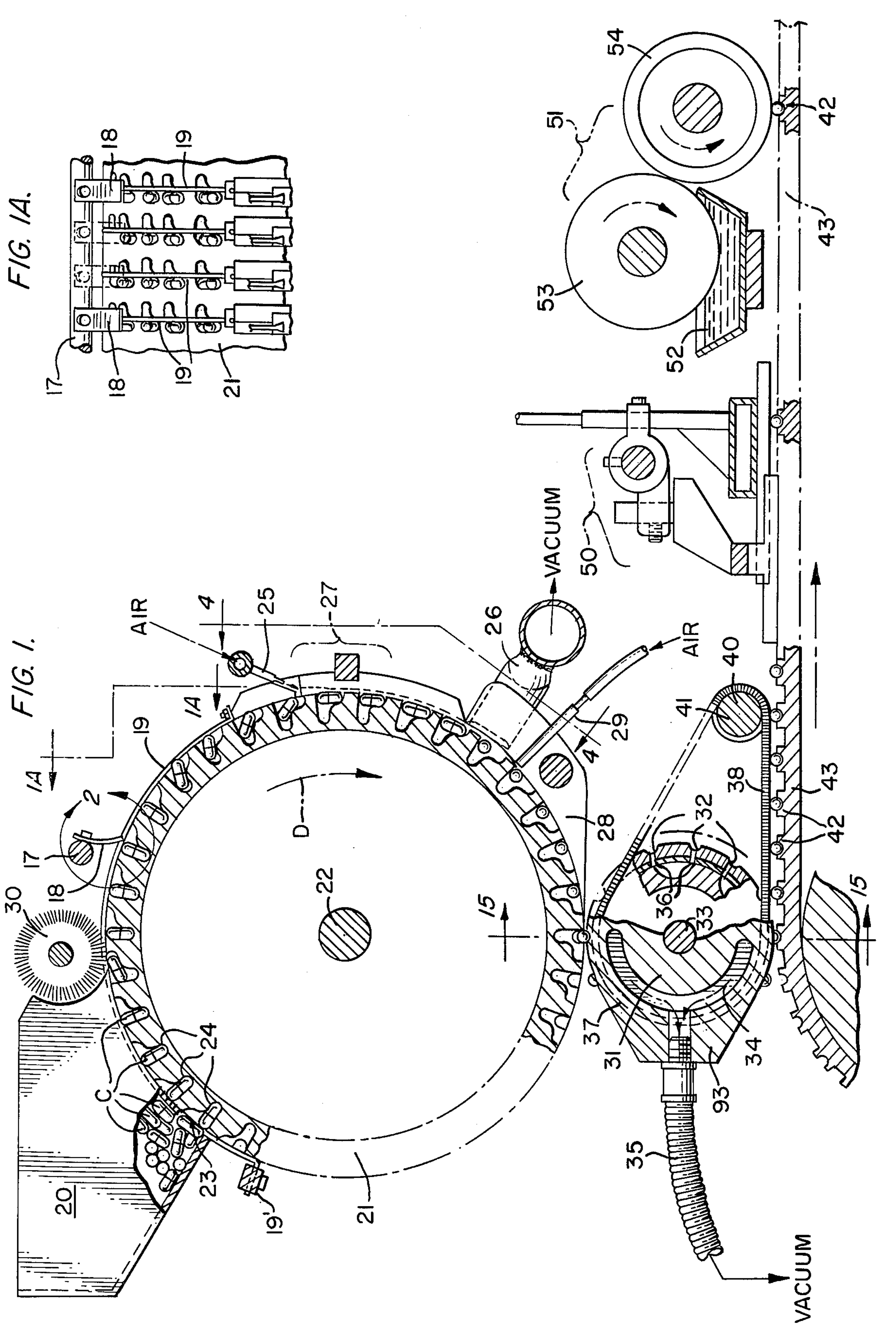
FIG. 1 is a vertical transverse sectional view taken through a machine embodying features of this invention.
FIG. 1A is a fragmentary face view of a portion of the cylinder appearing in FIG. 1.
Figure 10:
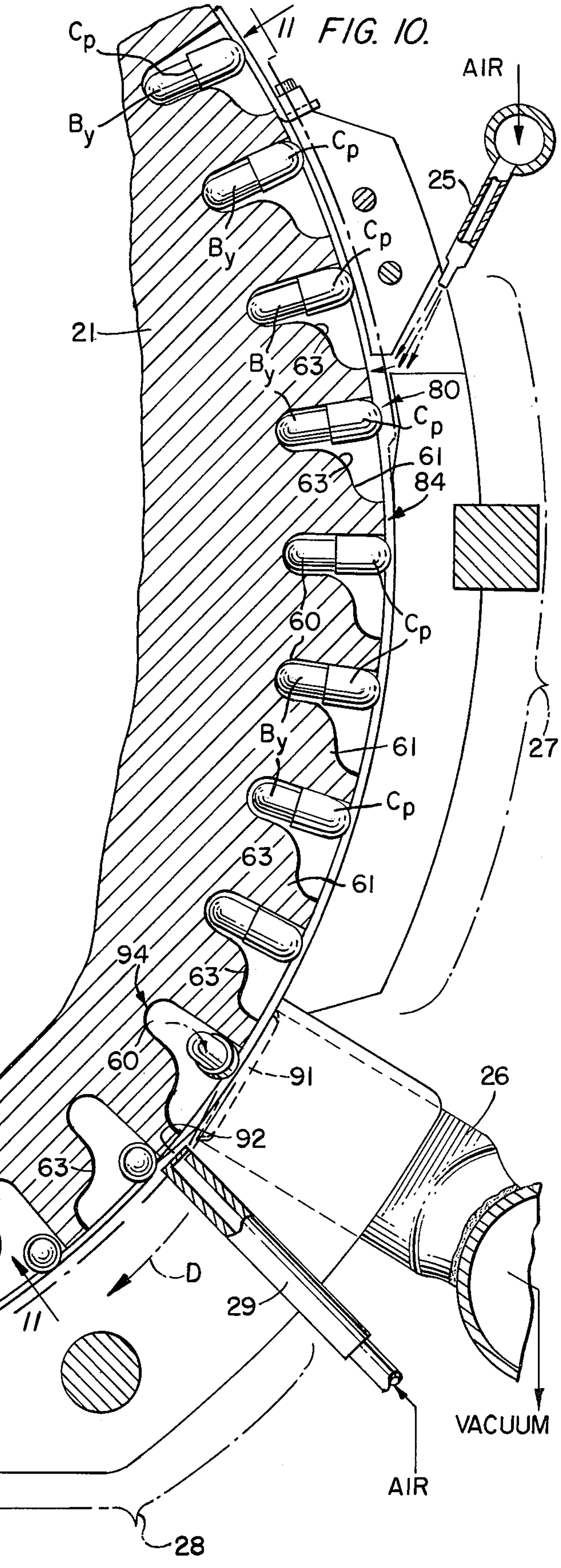
Figures 4, 5:
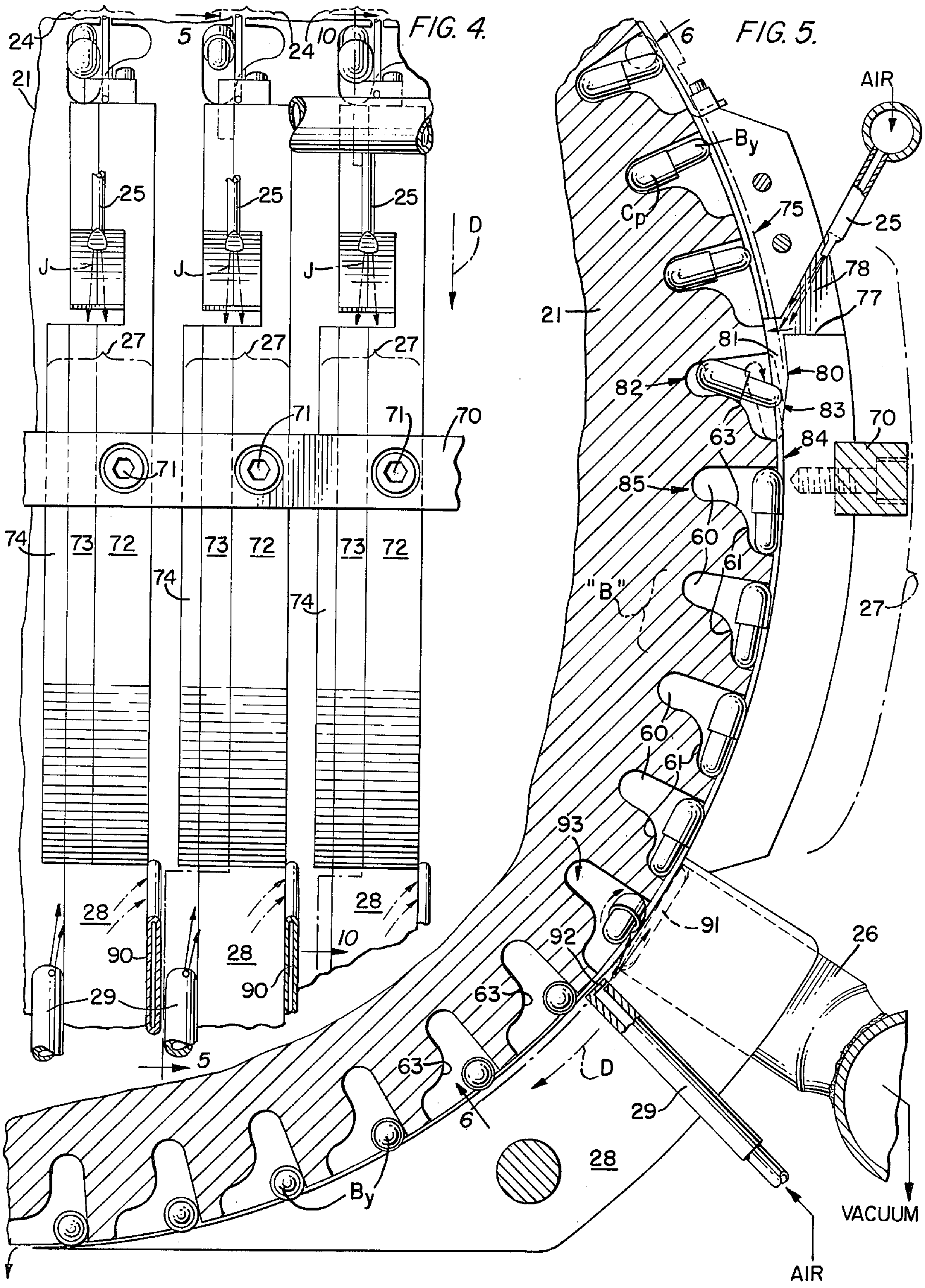
FIG. 4 is a fragmentary elevational view taken as indicated by the lines and arrows 4 — 4 which appear in FIG. 1.
FIG. 5 is a sectional view taken as indicated by the lines and arrows 5—5 which appear in FIG. 4.
Figure 6:
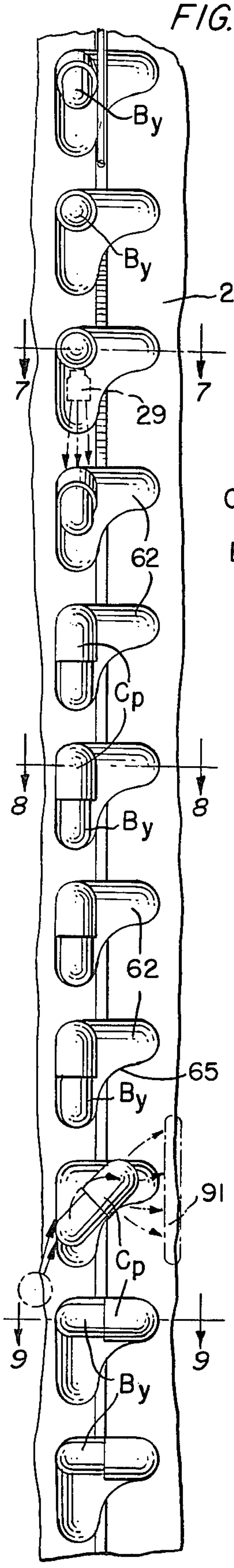
Figure 7:
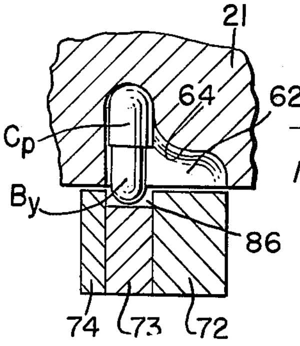
Figure 8:
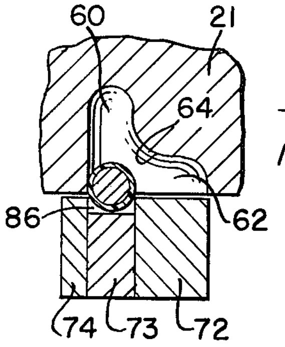
Figure 9:
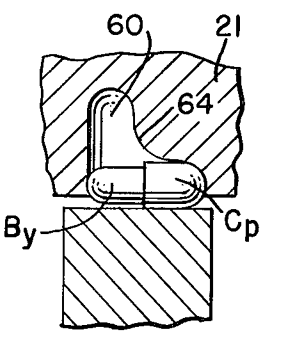
Figure 11:
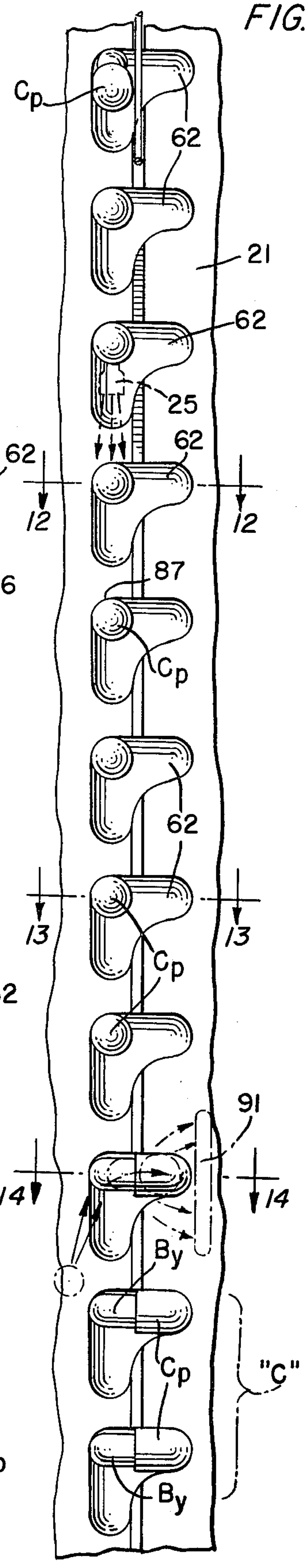
Figure 12:
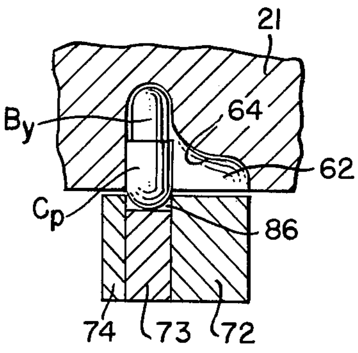
Figure 13:
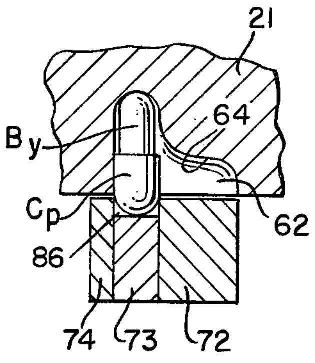
Figure 14:
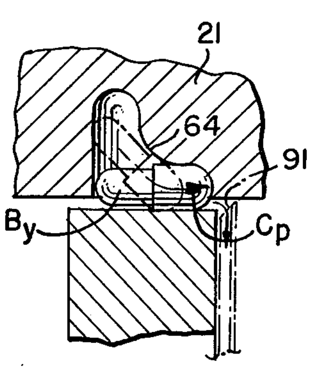
Figure 15:
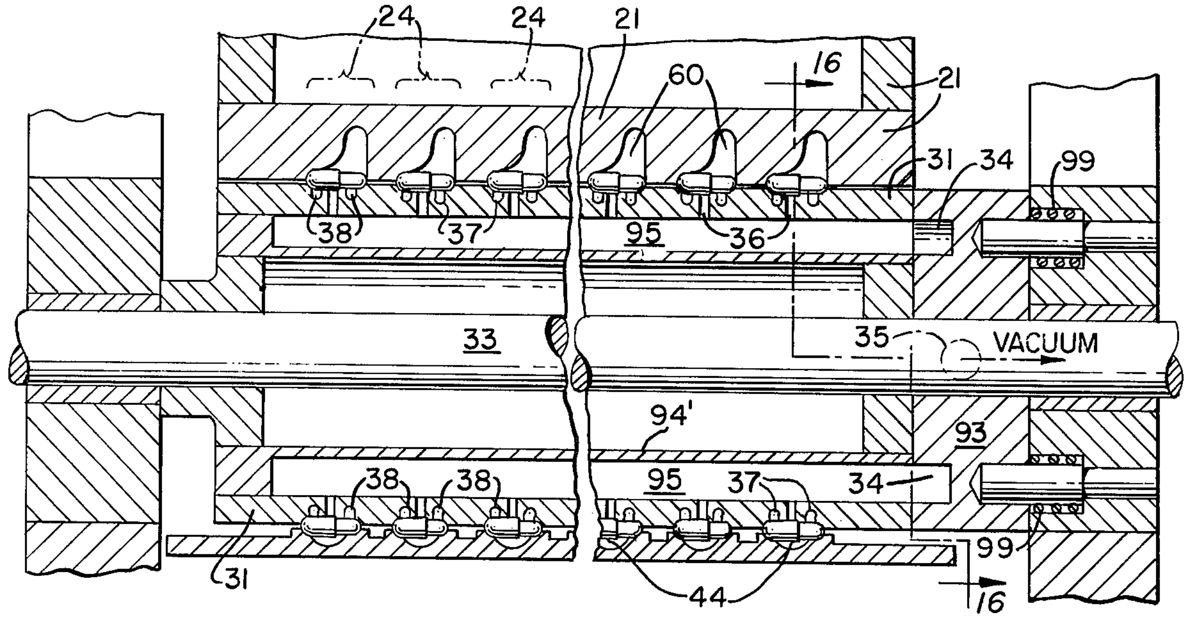
Figure 16:
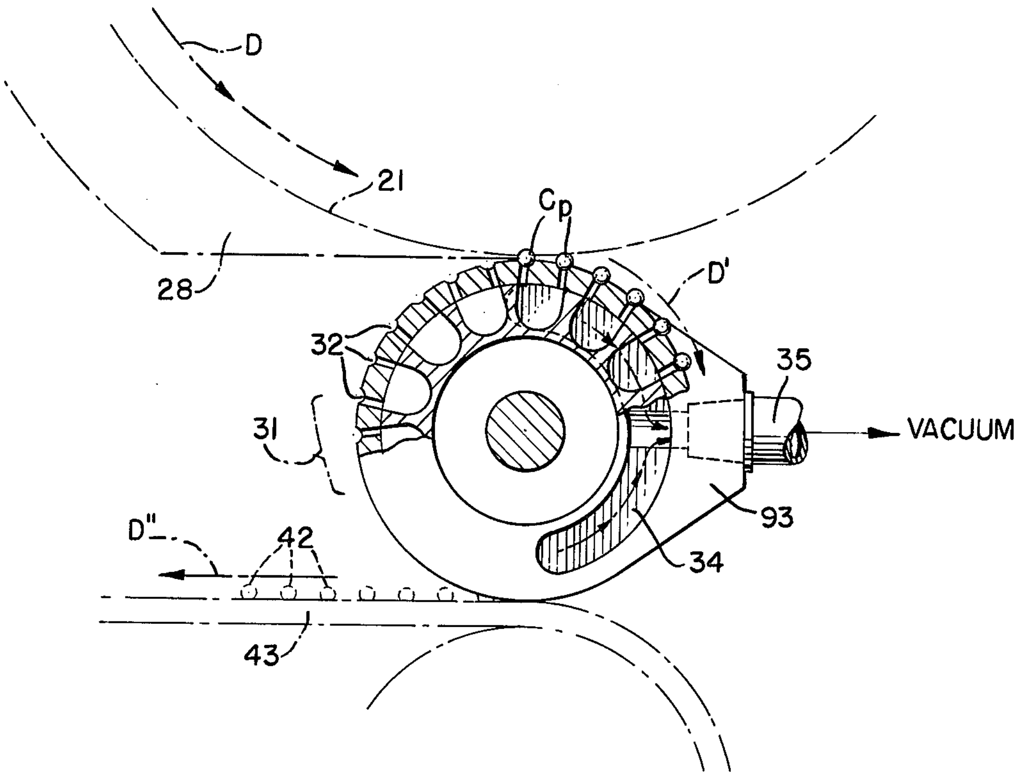

FIG. 6 is a surface arcuate view taken along the surface of the cylinder appearing in FIG. 5, and taken as indicated by the lines and arrows 6—6 which appear in FIG. 5. In FIG. 6 the drawing shows successive pockets selected for illustration of the sequence of events that occurs in the operation of the apparatus, in conjunction with a capsule which is presented with the capsule body portion in its "up" position;

FIGS. 7, 8 and 9 are sectional views taken as indicated by the lines and arrows 7—7, 8—8 and 9—9, respectively;

FIG. 10 is a sectional view taken as indicated by the lines and arrows 10—10 which appear in FIG. 4, and illustrating successive positions of capsules which are assumed to have been presented initially with the capsule cap portion "up", in order to illustrate the successive operations which are performed on a capsule which is initially so presented;

FIG. 11 is a sectional view taken as indicated by the lines and arrows 11—11 which appear in FIG. 10. Again, in FIG. 11, successive pocket positions are shown in order to illustrate operations which occur upon a capsule which is initially presented with the cap portion in its "up" position;

FIGS. 12, 13 and 14 are sectional views taken as indicated by the lines and arrows 12—12, 13—13 and 14—14, respectively;

FIG. 15 is a vertical transverse cross-sectional view through a vacuum transfer roller which comprises one component of the apparatus appearing in FIG. 1, and is taken as indicated by the lines and arrows 15—15 which appear in FIG. 1; and FIG. 16 is a fragmentary sectional view taken as indicated by the lines and arrows 16—16 which appear in FIG. 15.

In the specification which follows, specific terms will be used for the sake of clarity, and as descriptions of the specific forms of the invention which have been selected for illustration in the drawings. However, the use of such specific terms, and the use of such specific embodiments in the drawings, is not intended to imply any limitations with respect to the scope of the invention which is defined in the claims.

Turning to FIG. 1, the number 20 designates a capsule carrying hopper which is mounted on a suitable support (not shown), above a portion of a rotatable cylinder 21 which is mounted for rotation about an axle 22. A motor (not shown) is provided for rotating the cylinder 21. The hopper 20 has an opening as indicated at 23 for delivery of capsules to a plurality of equally spaced, generally elongated cavities 24 which are formed in and extend in rows across the outer surface of the rotatable cylinder 21. It will be observed that the capsule cavities have elongated portions which extend in a generally radial direction, as will be described in more specific detail hereinafter, allowing the capsules to be received by the cylinder 21 in generally radial positions. As will become apparent in further detail hereinafter, some of the capsules naturally fall into the cavities 24 in an upright position, with the body portions above the cap portions, while other capsules fall naturally into the cavities 24 in an inverted position, with the cap portions above the body portions.

Turning to the uppermost portion of the cylinder 21, the number 30 designates a rotating brush which serves to straighten out any capsules that may be lying in an angular position, as opposed to the upright position illustrated in FIG. 1. Just downstream of the brush 30 (in the direction D) is a further device, as shown within the circled arrow 2, which further serves to position the capsules in an upright position within their pockets 24.

Figure 2:
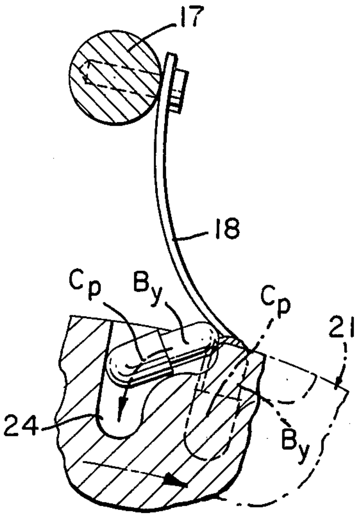
FIG. 2 is an enlarged fragmentary view of a portion of the apparatus of FIG. 1, as encompassed within the arrowed circle 2 which appears in FIG. 1.
Figure 3:
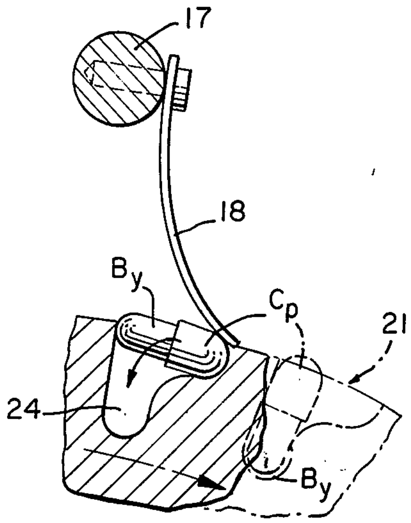
FIG. 3 is a view similar to FIG. 2, showing a subsequent step in the operation of this portion of the apparatus.

As shown in FIG. 1, and in particular detail in FIGS. 2 and 3, a cross-bar 17 is provided, carrying a plurality of flexible plastic strips 18, the lower tip ends of which are free, and which are arranged to contact the surface of the cylinder 21. It will be appreciated in FIGS. 2 and 3 that with either the cap portion $C_p$ in its up position, or the body portion $B_y$ in its up position, the plastic strip 18 contacts the capsule and urges it in the direction indicated by the curved arrows appearing in FIGS. 2 and 3, into upright positions within the pockets 24.

Means are provided for urging the capsules in a sideward direction, in order to maintain them in an upright position, and to prevent them from tilting sidewardly as they are fed in the upper portion of the cylinder 21. Such means appear in particular detail in FIG. 1A. It will be observed in FIG. 1A that the cavities 24 are arranged in rows extending longitudinally in the machine direction, and also that a plurality of separate, spaced-apart, substantially parallel rows are provided. Extending along each such row is a groove in which is positioned an elongated guide wire 19. The guide wires 19 are all parallel to each other, and are positioned in a manner to restrain sidewardly directed tilting movement of the upper portions of the capsules. The guide wires 19 pass around approximately ⅓ of the upper portion of the cylinder 21, as shown in FIG. 1, and are attached to a bar 19' located upstream of the hopper 20. (In this specification the expressions "upstream" and "downstream" are used with reference to the machine direction D appearing in FIG. 1). Accordingly, the wires 19 extend completely underneath the hopper 20, underneath the brush 30, underneath and to one side of the individual fingers 18, and have a downsteam termination at the upstream portion of the gaging blocks 27, which will be described in further detail hereinafter.

The number 25 designates a plurality of longitudinally directed air jets which are arranged to provide blasts of air in a direction generally along the direction D in which the rotatable cylinder 21 is rotating. The number 26 designates vacuum ducts having elongated openings, which are arranged to draw air substantially crosswise of the machine, and which effectively draw certain capsules in a crosswise direction, as appears in FIG. 1, and as will be described in further detail hereinafter.

The number 27 desingates a novel gaging block, the details of which will be described in further particularity hereinafter. The gaging block 27 serves to prevent substantial tilting movement, in the direction D, of those capsules which are arranged caps-up in their pockets 24, but to permit such movement of those capsules which are arranged bodies-up, under the influence of air from the jets 25. Gaging block 27 also assures that those capsules which have tilted to a substantially tangential arrangement will be retained in such condition as they continue to move downwardly in the direction D.

The number 28 designates a guide block for the capsules. It is shown as carrying an air inlet 29 for secondary air, which coacts with the vacuum ducts 26 as will be further described. Guide block 28 retains all capsules in position within their pockets, at the lower portion of the cylinder 21, as the capsules continue to move in the direction D.

Located directly beneath the cylinder 21 is a transfer cylinder 31 having a plurality of pockets 32, and an axle 33 about which the transfer cylinder 31 rotates. The pockets 32 are shaped, spaced and arranged to receive capsules transferred from the pockets of cylinder 21. This transfer is assisted by a stationary vacuum shoe 34 which, as shown, extends approximately 180° around the periphery of the transfer cylinder 31. A vacuum connection 35 is provided for the purpose of drawing vacuum upon the capsules in the pockets 32, by way of openings 36 at the bottoms of the pockets 32. The transfer cylinder 32 is provided with a at least a pair of grooves 37, spaced axially from each other, and located adjacent each of the ends of the transfer cylinder 31. A pair of extensible flexible members, shown as chain 38 in FIG. 1, are positioned in each of these grooves and stretched around an idler shaft 41. The chains 38 are positioned in a manner to pry the capsules C out of the pockets 32 at the bottom of their path of movement on the transfer cylinder 31, so that they move downwardly onto corresponding pockets 42 in a conveyor 43. The chain 38 is preferably an electrically conducting, extensible chain, which can be stretched around the idler shaft 41, and which is grounded to the idler shaft 41 and/or to the transfer cylinder 31, in a manner to discharge static electricity. This is an important advantage in accordance with this invention, in view of the fact that static electricity is frequently developed to such an extent that difficulty is experienced in transferring the capsules from one position to another.

The number 50 designates an air blasting means for separating the cap and the body portion to a limited degree in order to provide an exact overall length for each capsule, preparatory to the spin printing operation. This air separator is the subject of a separate U.S. Pat. No. 3,868,900, and is not itself a part of the invention claimed herein. The number 51 generically designates an offset printing apparatus which is ideally adapted for wrap-around printing in accordance with this invention. It includes an ink reservoir 52, a transfer roll 53, and a printing roll 54 which is continuously rotated in the direction indicated by the arrow thereon, in contact with the capsules as they move underneath the roll 54, carried by their carriers 42 on the conveyor 43. In the spin printing process, one or more elongated forms of indicia are preferably printed on the outer surface of the capsule by adjusting the speed of rotation of the roll 54 so that its surface speed is considerably greater than the speed of movement of the conveyor 43. Preferably capsule carrier 42 is composed of a slippery material such as polytetrafluoroethylene for example, which has a coefficient of friction which is less than that of the printing roll, thus permitting the capsule to rotate freely upon its axis under the frictional influence of the printing roll 54 during the spin printing process.

It will be appreciated that the capsule orienting apparatus of this invention is useful independently of the devices 50 and/or 51, and that the capsule orienting features of this invention may be used for purposes other than spin printing. For example, in view of the ever present possibility of imperfections occurring during the manufacture of the caps or bodies of the capsules, or of the assembled capsules, and in view of the danger of breakage or damage to the capsules in handling or in delivery, it is important to provide a capsule inspection station prior to the time that the capsules are filled with the drug of other substance which they are intended to contain. For the purpose of automatic capsule inspection, utilizing one or a plurality of production-line capsule scanning devices or the like, it is important and advantageous to conduct the capsules at high speed along a conveyor in an oriented condition, with all of the cap portions arranged toward one side of the conveyor and with all of the body portions arranged toward the opposite side of the conveyor. Other capsule handling operations are also facilitated by providing the capsules in the oriented condition referred to herein.

Referring now to FIGS. 5, 6, 10 and 11 of the drawings, it will be apparent that each capsule cavity 24 includes a generally radially directed pocket portion 60, a generally longitudinally directed portion 61 and a generally transversely directed portion 62. The pocket portion 60 is connected, by walls having a surface curvature shown at 63, to the longitudinal portion 61, and by walls having surface curvature 64 to transverse portion 62. Another wall having a curved surface portion 65 provides a connection from longitudinal pocket portion 61 to transverse pocket portion 62.

A typical capsule is shown in FIG. 5 in its upright position, in which the body portion $B_y$ is located above the cap portion $C_p$. FIG. 5 has been specially prepared to show the sequence of operations that are applied to a capsule which is initially retained in its pocket in a body-up position. It will be understood, in the normal operation of the apparatus, each capsule is introduced into each body portion completely at random, with some of the capsules in a bodies-up position and with others of the capsules randomly arranged in caps-up positions. However, the capsules have been illustrated in FIG. 5 as though all of them had initially been presented in a bodies-up position, in order more clearly to illustrate the manipulated steps that are applied to the capsules.

It will be appreciated that the longitudinally directed air jets 25 in FIG. 5 impinge upon the body portions $B_y$ in the manner shown therein, and tilt them about the curved surface 63 to the position illustrated as position B in FIG. 5, in which the capsules are arranged with their axes in substantially the machine direction. It will further be appreciated from FIGS. 5–9 that the transverse vacuum means 26 draws upon the cap portions $C_p$ and slides them around the curved portions 65, moving the capsules into the positions illustrated as position "C" in the drawings.

Turning now to FIGS. 10–14 of the drawings, each capsule is there shown as though initially in its inverted position, with each cap $C_p$ above the body portion $B_y$. The longitudinally directed air jet 25 impinges upon the cap portion $C_p$ as shown in FIG. 10, but the cap portion $C_p$ is prevented from swinging into position "B" by the novel gaging block 27, details of which will appear further hereinafter. Elements of the gaging block are spaced apart at a distance greater than the diameter of capsule body portion $B_y$ but less than the diameter of capsule cap portion $C_p$. Subsequently, the transversely directed vacuum means 26 swings each capsule around the curved surface 64 which appears in FIG. 14, moving the cap portion toward the same side of the machine as the cap portions of the capsules that were originally in their upright positions. Thus, in this manner, all of the capsules are "oriented" which, in accordance with this invention, means that all caps of the capsules are arranged toward one side with respect to the machine direction and all of the body portions of the capsules are arranged toward the other side with respect to the machine direction.

It will now be apparent that, with all of the capsules thus oriented, they move downwardly around the periphery of the rotatable cylinder 21 maintained within their pockets in an oriented condition by the guide block 28, and are deposited under the influence of gravity onto the carriers 32 of the transfer roll 31. They are subsequently deposited on carriers 42 of conveyor 43 and are subjected to printing of a wrap-around type, the printing rolls 54 being driven at a greater peripheral velocity than the velocity of movement of the conveyor 43 and the carriers 42 being recessed at 44 (FIG. 15) to avoid smearing of the printed indicia.

In accordance with this invention a novel gaging block means, comprehensively identified by the number 27, is provided adjacent to the cylinder, as shown in FIG. 1. Turning more particularly to FIGS. 4 and 5 of the drawings, structural details of the gaging block means 27 will further become apparent. It will be appreciated from an examination of FIGS. 1A and 4 that the cylinder 21 contains a multiplicity of rows of the pockets or carriers 24, and that each such row has a multiplicity of pockets spaced apart from one another along the machine direction, and that the pockets of each row are moving parallel to each other in the direction D. As shown in FIG. 4, each such row of pockets 24 is provided with an individual air jet 25, each blasting an individual jet of air J upon the capsules contained within the carrier 24 of that row. It is important in accordance with this invention that a plurality of gaging blocks 27 are also provided, each gaging block being specifically arranged adjacent to each such row of capsule carrying pockets 24, As shown in FIG. 4 a cross strap 70 is provided, having spaced bolts 71, securing each individual gaging block 27 in position immediately adjacent to its corresponding row of capsule carriers 24.

As shown in FIG. 4, each gaging block 27 comprises three individual metal strips 72, 73 and 74. These are tightly held together and are immovable with respect to each other.

As is shown in FIG. 5, gaging block strip 72 has a generally arcuate configuration and extends down from the cross strap 70 to a location substantially immediately adjacent to the outer periphery of the rotatable cylinder 21, as indicated by the lowermost surface 75 of gaging block strip 72. By way of contrast, the inner surface 76 of gaging block strip 73 has a cut-out portion indicated by the number 77 forming an air entrance 78 shielded by the gaging block strip 72 and also by the gaging block strip 74. Thus, air emanating from the air jet 25 is isolated with respect to the particular row of pockets 24, by the presence of the outer gaging block strip walls 72 and 74. The innermost surface 80 of middle gaging block strip 73 is spaced apart from the outer periphery of rotatable cylinder 21, providing a space 81 allowing for the tilting movement of those capsules which are arranged with the body portions up. Such tilting movement appears at 82 in FIG. 5. The aforementioned innermost surface 80 of middle gaging block strip 73 has an inwardly inclined surface 83, which inclines inwardly toward the periphery of the rotatable cylinder 21, and has a further curved surface 84 which is spaced closely to the outer periphery of rotatable cylinder 21. The inclined surface 83 cooperates with the surface 84 to confine each capsule during its tilting movement as illustrated at 82 in FIG. 5, and to confine such capsule after the tilting movement has been completed, as indicated at 85 in FIG. 5.

Further referring to FIG. 5, it will be observed that the cut-out portion 77 provides a substantially radially extending wall against which the air from the conduit 25 is projected. The angular relationship of the wall 77 provides an air flow component as indicated by the substantially radially directed arrow in FIG. 5, which applies a portion of the air directly downwardly into the pocket portions 60. This agitates each capsule within its pocket portion and facilitates the tilting movement heretofore described.

It will accordingly be further appreciated that the inner walls of the outer gaging block strips 72 and 74 cooperate with the middle gaging block strips 73 to form a channel extending longitudinally along the row of carriers 24, such channel appearing at 86 in FIGS. 7, 8, 12 and 13, isolating the flow of air from neighboring rows. This is an important and advantageous feature of this invention, because the capsules which are carried in the pockets 24 are very light in weight, and are easily affected by air flow or air currents. By shielding each row of pockets from rows adjacent thereto to isolate the air flow to a longitudinal direction in each particular row, and by preventing stray currents or eddy currents from developing which might affect the capsules in neighboring rows, precision operation is achieved.

The rows of pockets are also shielded from each other at the transverse vacuum means 26 by intervening guide blocks 28 to prevent any currents from being transmitted from one row to rows adjacent thereto.

It will be apparent, from a close examination of FIGS. 7 to 9 and FIGS. 12 to 14, that the width of the gaging block 73 is critically important. As shown in FIGS. 7 and 8, the gaging block 73 is slightly wider than the diameter of the body portion $B_y$ of the capsule, thus permitting the forward tilting movement of the capsule as shown in FIG. 7. Such forward tilting movement also appears in FIG. 5, at positions 82 and 85. By way of contrast, referring particularly to FIGS. 12 and 13, this width dimension of the middle gaging block strip 73 is slightly less than the diameter of the cap portion $C_p$ of the capsule, as shown in FIG. 12. Thus, the cap portion $C_p$ in FIG. 12 is gripped or pinched between the side walls of channel 86, such side walls being the inner walls of the end portions of gaging block strips 72 and 74. This pinching or gripping movement prevents any forward tilting of the cap portion $C^p$ under the influence of the air jet 25. The rear wall portion 87 of the radially directed pocket portions 60 drives the cap portion $C_p$ through the channel 86 (see FIGS. 11, 12 and 13) against the resistance created by the restricted width of the channel 86. Accordingly, the cap portion $C_p$ is shown in the same position in FIG. 13 as it is in FIG. 12.

Accordingly, it is possible to provide a series of gaging blocks which are ideally adapted for the handling of a wide variety of different sizes and shapes of capsules. By simply interchanging different middle gaging block strips 73, different gages may be obtained for different capsules.

In accordance with this invention, a novel vacuum means is provided for swinging the cap ends of the capsules all in the same direction, and leaving the body portions of the capsules extending in the opposite direction. This novel means includes the vacuum means 26 and the guide block 28 associated therewith, including further parts and structural details as will now be described with particularity.

With particular reference to FIGS. 4, 5 and 10, it will be apparent that those capsules which were originally arranged with the body portions up as shown in FIG. 5, have all tilted and are shown arranged in the longitudinal pocket portion 61, in that figure, after passing through the gaging blocks 27. It will further be appreciated that in FIG. 10 the capsules which have been initially arranged with their cap portions up, in the radially directed pocket portion 60, have not been tilted and have been driven through the restricted channel 86 by the driving force of the rear wall 87 of the radially directed pocket portion 60, and continue in an upright position in the radially directed pocket portion 60 at the time of exiting from the gaging block 27.

As is shown in FIGS. 4, 5 and 10, the vacuum source 26 is connected to a plurality of hollow, flat vacuum plates 90 each having an elongated slit opening 91 at its end. The plates 90 are conveniently supported upon the guide block 28 which is suitably secured to the frame of the machine or to any other suitable stationary support. It will be apparent in FIG. 4 that the guide blocks 28 are spaced apart from each other, with each guide block in a position corresponding to each longitudinal row of carriers 24 as they move in the machine direction. It will further be appreciated that each vacuum plate 90 is positioned at one side of the corresponding guide block 28, and that a source of secondary air such as an air pipe 29 is provided on the opposite side of the same individual guide block 28. It will be apparent in FIG. 5 and in FIG. 10 that the pipe 29 has an opening 92 which extends in an upstream direction as indicated by the arrow in FIG. 5, admitting secondary air in the area immediately adjacent to the peripheral surface of rotatable cylinder 21. Further, it will be appreciated that the guide block 28 has an inner surface which is spaced closely to the outer periphery of the rotatable cylinder 21, providing an air gap between them, through which air may flow sidewise across the row of carriers 24. Similarly, it will be appreciated that the slit 91 in the flat vacuum plate 90, for each row, is located across the row in a position opposite to the opening 92, thus providing for a flow of air to be drawn by the vacuum, crosswise across the row 24, as indicated by the arrows appearing in FIG. 4. It will be apparent that this crosswise flow of air induces the longitudinally-positioned capsules of FIG. 5 to shift to a transverse position, as indicated by the arrow at capsule position 93 in FIG. 5. As shown in FIG. 5, all capsule positions subsequent to the vacuum slit 91, in the machine direction D, are transversely arranged with the cap portions $C^p$ toward one side and with the body portions $B_y$ on the other side.

Similarly, with reference to FIG. 10, the capsules with the cap portions $C_p$ upwardly arranged in the radially directed pocket portions 60, are also affected by the vacuum which is drawn in the manner heretofore described, drawing the cap portions toward the same side, as illustrated at position 94 in FIG. 10 of the drawings. It will further be appreciated that all of the capsules are arranged with the body portions in the same direction, at all locations in the downstream direction as indicated by the arrow D downstream of the vacuum slit 91.

It is important to observe in accordance with this invention that the operation of the vacuum, drawn as heretofore described, is substantially isolated with respect to each of the rows of capsule carriers 24. This is effected by the presence of the intervening guide blocks 28, which prevent any currents from being transmitted from one row to its adjacent or neighboring rows. This is important and advantageous, because of the fact that the capsules are very light in weight and are very susceptible to mis-direction under the influence of stray currents, or eddy currents.

The combination of drawing a vacuum through the slit 91, together with the secondary air which is directed in an upstream manner through the opening 92, is important and advantageous. The secondary air stream 92 agitates each individual capsule within its pocket, providing it in substantially a state of suspension in which it is readily susceptible to the influence of the air which is drawn crosswise of the machine direction, by the vacuum slits 91.

The operation of the vacuum slits 91 appears in further detail in FIGS. 9 and 14 of the drawings. In FIG. 9, it is clearly shown that the capsules in which the body portions were initially in upward position are now being drawn around the curved surface extending between the longitudinal pocket portion and the transverse pocket portion, in the manner indicated by the arrows at the lower portion of FIG. 6. Similarly, in FIG. 14, the capsules are shown in the same position, with the cap portions $C_p$ extending in the same direction as the cap portions $C_p$ in FIG. 9, having been swung from the substantially radially directed pocket portion into the transversely directed pocket portion of each carrier, all as shown in the lower portion of FIG. 11.

Another important and advantageous mechanism in accordance with this invention appears particularly in FIGS. 1, 15 and 16 of the drawings. As will be apparent, the capsules discharged from the bottom of the cylinder 21, as shown in FIG. 1, are deposited into transversely arranged capsule carrying pockets 32 which are maintained on the surface of the transfer cylinder 31. As appears in detail in FIGS. 15 and 16, this transfer is effected by a vacuum applied through the vacuum line 35, which is connected into a vacuum shoe 93 having a semi-circular vacuum passage 34. The shoe 93 and the passage 34 are maintained stationary, as shown in FIG. 15. The passage 34 in the vacuum shoe 93 is open toward the cylinder 31, and shoe 93 is urged immediately adjacent to the end of cylinder 31 by springs 99. Cylinder 31 includes an inner cylinder 94' providing a vacuum space 95 communicating with the space 34 as the cylinder 31 rotates through the 180° arc where the space 34 is present. Thus, during that arc, a vacuum is exerted upon the capsule pockets 24, through the space 95 and through openings 36 which extend from the spaces 95 to the capsule pockets 32. Accordingly, the vacuum, drawn through the connection 35, is applied to the capsules at the bottom of cylinder 21, and draws those capsules into the corresponding pockets 32. Further, the capsules are maintained in the pockets 32 during the entire 180° path of their travel downwardly to the conveyor 43, in this manner.

As is shown in FIG. 15, a multiplicity of slots 37 are provided in the periphery of the cylinder 31, for a multiplicity of spaced parallel expandable springs 38, 38, two for each row of pockets 24. As appears in FIG. 1, these springs separate from the periphery of the cylinder 31 in a manner to pry the capsules out of their pockets 32, and to deposit them onto corresponding pockets 42 on the conveyor 43. In this manner, the springs 38, 38 (which are spaced apart from each other at a distance less than the total length of the capsule) overcome the adhering effect of static electricity. Further, because of the fact that they are preferably electrically conductive and are connected to ground through the member 40, or through the cylinder 31 itself, or both, the capsules themselves are effectively grounded by reason of their contact with the springs 38, thus facilitating their handling without the disturbing effects of static electricity.

It will be appreciated that the arrangement of the apparatus in the manner shown in FIGS. 1 and 16, with the transfer roll interposed between the cylinder 21 and the conveyor 43, provides a particularly compact arrangement wherein the members 50 and 51, together with necessary driving motors and vacuum equipment, may be compactly arranged and positioned with respect to each other. Alternatively or in conjunction with the members 50 and 51, various scanners or other inspection devices may be compactly incorporated into the apparatus, because of the nature of this construction and arrangement.

The efficiency, speed and certainty of operation of the apparatus are greatly enhanced by the novel gaging block structure heretofore described, by the novel sidewardly directed vacuum means 26, by the isolation of individual rows of capsule carrying pockets from each other when under the influence of air or of vacuum, and the shipping effect of the electrically conductive chains 38, all in a manner to provide rapid, efficient and entirely correct sorting and delivery operations, without crushing, damaging or destroying the capsules as they are being handled, and with complete accuracy and correctness of orientation.

Although this invention has been described in conjunction with certain specific forms and certain modifications thereof, it will be appreciated that a wide variety of other modifications can be made without departing from the spirit of the invention. For example, some of the features of the invention may be used independently of other features. Indeed, the capsule orienting and rectifying apparatus is capable of other uses independently of wraparound printing, although it is admirably adapted for that use.

Additionally, in accordance with this invention, various equivalent elements may be substituted for those shown and specifically described, and in many instances parts may be reversed in ways which will become apparent to those skilled in the art, all without departing from the scope and spirit of this invention as defined in the appended claims.

We claim:

1. In an orienting and turning apparatus for capsules having body portions and enlarged cap portions arranged along substantially a common axis, wherein a continuously movable capsule transporting means is provided having a plurality of spaced-apart pockets for the capsules, and said apparatus having a means for feeding a plurality of capsules for reception at random, caps-up and caps-down in said pockets, each said pocket having an upright pocket portion for receiving said capsule therein with the capsule arranged in a substantially upright attitude relative to the direction of capsule movement, each said pocket also having a longitudinal pocket portion arranged to carry the capsule at an attitude with the capsule axis extending in approximately the transport direction, and each said pocket having a substantially crosswise pocket portion arranged to carry the capsule arranged in a substantially crosswise attitude relative to the direction of its movement and also substantially crosswise of said upright position, the combination which comprises:

(a) gaging means downstream of said capsule feeding means and adjacent the path of movement of said pockets, said gaging means having spaced-apart wall members and a ceiling member having a surface extending between said wall members and extending above them in the transport direction to form an elongated gaging passageway extending in the transport direction, said gaging means being adjusted for predetermining the width of said passageway to a value greater than the outside diameter of said capsule body portion but lesser than the outside diameter of said capsule cap portion, whereby said cap portions are frictionally engaged by said wall members to maintain said caps-up capsules in a caps-up position;

(b) tilting means for tilting the caps-down capsules toward the transport direction between the wall members of said gaging means, said upright pocket portions having surfaces arranged to engage said cups-up capsules to overcome the frictional resistance of said wall members to force said caps-up capsules along said gaging passageway while maintaining them in a caps-up attitude, and (c) vacuum turning means downstream of said gaging means for causing all of said cap portions that are in an upright attitude and all of said cap portions which are in an attitude extending in the transport direction to swing to an attitude in a substantially crosswise direction.

2. The apparatus defined in claim 1 wherein said ceiling member has an inclined surface located downstream of said tilting means and inclined toward said pockets.

3. The apparatus defined in claim 2, wherein the downstream portion of said inclined surface includes a lower ceiling surface spaced above the bottoms of said longitudinal pocket portions at a distance which is greater than the cap diameter but less than the capsule length.

4. The apparatus defined in claim 1 wherein the distance between the bottom of the substantially upright pocket and the ceiling of the gaging passageway is greater than the overall length of the capsule.

5. The apparatus defined in claim 1, wherein said tilting means includes means forming a passage arranged to carry a fluid.

6. The apparatus defined in claim 5, wherein said fluid is air.

7. The apparatus defined in claim 5, wherein said pockets are arranged in a plurality of adjacent rows extending substantially in the transport direction and wherein said gaging means are positioned adjacent each of said rows, and further including shielding means operatively located with respect to said vacuum turning means to inhibit vacuum currents from being transmitted from one row to rows adjacent thereto.

8. Apparatus as defined in claim 1, wherein each pocket includes a wall of rounded configuration connecting the upright pocket portion to the longitudinal pocket portion which is arranged in the transport direction, and wherein said tilting means includes a means for applying a flow of air to the upper body portions of said capsules, to tilt said capsule upper body portions into an attitude extending in the transport direction.

9. Apparatus as defined in claim 1, wherein said pocket includes a wall of rounded configuration connecting the upright pocket portion to the substantially crosswise pocket portion, and wherein said means (c) is arranged to draw air upon the cap portion of said capsule, to swing said cap portion from said upright pocket to said crosswise pocket.

10. The apparatus as defined in claim 1, wherein each pocket includes a wall of rounded configuration connecting the transport direction portion to the crosswise pocket portion, and wherein said means (c) is arranged to draw air upon the cap portions of said capsules, to swing said cap portions from said transport direction pocket into the crosswise pocket portion.

11. In a method for orienting and turning capsules having body portions and enlarged cap portions arranged along substantially a common axis, wherein said capsules are continuously movable transported by a transport device having spaced apart pockets for the reception of said capsules, said pockets arranged in a plurality of adjacent rows extending substantially in the transport direction and wherein a plurality of capsules are fed for reception at random, caps-up and caps-down in said pockets, and wherein each said pocket has an upright pocket portion for receiving said capsule therein with the capsule arranged in a substantially upright attitude relative to the direction of capsule movement, and wherein each said pocket also has a longitudinal pocket portion arranged to carry the capsule at an attitude with the capsule axis extending in approximately the transport direction, and each said pocket having a substantially crosswise pocket portion arranged to carry the capsule in a substantially crosswise attitude relative to the direction of its movement and also substantially crosswise of said upright position. the steps which comprise:

(a) gaging said capsule path of movement downstream of said feeding step by interposing into said path an elongated gaging passageway extending in the transport direction, the width of said passageway being adjusted in a manner to predetermine the width of the passageway to a value greater than the outside diameter of said capsule body portion but lesser than the outside diameter of said capsule cap portion, whereby said cap portions are frictionally engaged by said gaging operation to maintain said caps-up capsules in a caps-up position;

(b) tilting the body portions of the caps-down capsules toward the transport direction within said gaging passageway while frictionally engaging the surfaces of said caps-up capsules, driving said caps-up capsules to overcome frictional resistance to move said caps-up capsules along said gaging passageway while maintaining them substantially in a caps-up attitude;

(c) applying a vacuum downstream of said gaging means to cause all of said cap portions that are in an upright attitude and all of said cap portions that are in an attitude extending in the transport direction to swing to an attitude in a substantially crosswise direction, and (d) providing shielding means cooperating with the surface of said transport device located between adjacent rows to shield individual rows of pockets from rows adjacent thereto during both said tilting step and said vacuum turning step to inhibit stray or eddy currents.

12. The method defined in claim 11, including the further step of applying a limiting force above said capsules in said passageway to confine said capsules in a downward direction toward said pockets.

13. The method defined in claim 12, including further an inclined forcing step said step comprising forcing said capsules downwardly toward said pockets in an angular manner, within said passageway, after said capsules have been subjected to said tilting step.

14. The method defined in claim 13, including the further step, downstream of said inclined forcing step, of maintaining the tilted capsules in a tilted position by limiting upward movement of the sides of said capsules while in a tilted position, away from the longitudinal pocket portions in the pocket in which the capsule is contained.

15. The method defined in claim 12, further including the step of limiting upward movement of the end of each capsule, out of its pocket, under the influence of said tilting step.

16. The method defined in claim 11, wherein said tilting step is accomplished by applying a fluid to the upper portions of said capsules which are arranged in an upright attitude.

17. The method defined in claim 16, wherein said fluid is air.

18. The method defined in claim 11, including the further step of tilting the capsules around a wall of rounded configuration connecting the upright pocket portion to the pocket portion which is arranged in the transport direction, and further including the step of tilting by the application of a flow of air to the upper portions of said capsule.

19. In a capsule orienting and turning apparatus for capsules which are randomly arranged in a container, said capsules having body portions and cap portions which are of greater transverse dimensions than said body portion, wherein a continuously movable capsule separating and transporting conveyor is provided having a plurality of pockets having generally upright pocket portions for receiving the capsules therein, said pockets being substantially equally spacedapart, each said pocket also having a capsule receiving substantially longitudinal pocket portion arranged to carry the capsule with the capsule axis extending in approximately the direction of its movement, and each said pocket having a substantially crosswise pocket portion arranged to carry the capsule arranged substantially crosswise of the direction of its movement, means for moving said conveyor along a predetermined path with some of the capsules in a caps-up attitude and others with a caps-down attitude, and wherein the pockets are arranged in a plurality of adjacent rows that extend in the direction of the predetermined path, the combination which comprises:

means for shifting the caps-down capsules to an attitude arranged generally along said predetermined path, means for substantially restraining said caps-up capsules from such shifting movement, vacuum means directed to draw transversely of said predetermined path for shifting the cap portions of those capsules which are in a caps-up position, and also the cap portions of those capsules which have been shifted by said shifting means, all in a direction generally crosswise with respect to said predetermined path, and shielding means adjacent both said shifting means and said vacuum means and cooperating with the surface of said conveyor located between adjacent rows to shield individual rows of pockets from rows adjacent thereto to inhibit stray or eddy currents.

20. Apparatus as defined in claim 19, wherein said pocket includes a wall of rounded configuration connecting the upright pocket portion to the substantially crosswise pocket portion, and wherein said vacuum means is arranged to draw air upon the cap portion of said capsule, to swing said cap portion from said upright pocket to said crosswise pocket.

21. The apparatus as defined in claim 19, wherein each pocket includes a wall of rounded configuration connecting the transport direction portion to the crosswise pocket portion, and wherein said vacuum means is arranged to draw air upon the cap portions from said transport direction pocket into the crosswise pocket portion.

22. The apparatus as defined in claim 19, wherein said vacuum means includes a plurality of spaced-apart, substantially flat plates each extending parallel to a row of said pockets.

23. The apparatus as defined in claim 19, wherein said vacuum means is combined with a source of secondary air arranged generally crosswise of the path of movement of said pockets from said vacuum means and including means for projecting said secondary air in a direction counter to the direction of movement of said pockets.

24. The apparatus as defined in claim 19 wherein said shielding means includes a guide means that is positioned adjacent said vacuum means.

25. The apparatus as defined in claim 24, wherein said guide means includes a restraining member having a shape corresponding substantially to, and arranged closely adjacent to, said conveyor upon which said pockets are carried.

26. The apparatus as defined in claim 25, wherein said restraining member includes a guide block comprising a curved downstream surface adjacent said conveyor, an outwardly diverging surface, and a further surface spaced farther from said conveyor than the surface first mentioned.

27. The apparatus as defined in claim 19, wherein said vacuum means includes an elongated slit through which vacuum is drawn.

28. The apparatus as defined in claim 27, wherein said slit extends substantially along the path of movement of said conveyor.

29. In a method of orienting and turning capsules which are randomly arranged in a container, said capsules having body portions and cap portions which are of greater transverse dimensions than said body portions, wherein said capsules are transported by a transport device having a plurality of pockets having generally upright pocket portions, said pockets being substantially equally spaced apart, each said pocket also having a capsule receiving substantially longitudinal pocket portion arranged to carry the capsule with the capsule axis extending in approximately the direction of its movement, and each said pocket having a substantially crosswise pocket portion arranged to carry the capsule arranged substantially crosswise of the direction of its movement, with some of the capsules arranged in a caps-up attitude and others in a caps-down attitude, and wherein said pockets are arranged in a plurality of adjacent rows that extend in the transport direction, the steps which comprise:

shifting the caps-down capsules to an attitude arranged generally along the transport direction, substantially restraining said caps-up capsules from such shifting movement, drawing a vacuum transversely of the transport direction for shifting the cap portions of those capsules which are in a caps-up position, and also the cap portions of those capsules which have been shifted by said shifting step, all in a direction generally crosswise with respect to the transport direction, and providing shielding means cooperating with the surface of said transport device located between adjacent rows to shield each said row from a row adjacent thereto during both said shifting and vacuum drawing steps to inhibit stray or eddy currents.

30. The method defined in claim 29, further including the step of drawing said vacuum transversely of said rows.

31. The method as defined in claim 29, wherein said pocket includes a wall of rounded configuration connecting the upright pocket portion to the substantially crosswise pocket portion, and wherein said drawing step includes the step of drawing a vacuum upon the cap portion of said capsule, to swing said cap portion from said upright pocket to said crosswise pocket.

32. The method as defined in claim 29, wherein each pocket includes a wall of rounded configuration connecting the transport direction portion to the crosswise pocket portion, and wherein said drawing step includes the step of drawing a vacuum upon the cap portions of said capsules, to swing said cap portions from said transport direction pocket into said crosswise pocket portion.

33. The method as defined in claim 29, wherein said vacuum drawing step includes drawing said vacuum at a plurality of spaced apart locations, each corresponding to a row of said pockets.

34. The method defined in claim 29, wherein said vacuum drawing step is combined with the step of supplying a flow of secondary air arranged generally crosswise of the path of movement of said pockets from the point of application of said vacuum.

35. The method defined in claim 34 wherein said supply of secondary air includes the step of projecting said secondary air in a direction counter to the direction of movement of said pockets.

36. The method defined in claim 29, wherein said shielding step further includes the step of guiding said capsules downstream of said vacuum drawing step.

37. The method defined in claim 29, wherein said restraining step includes the step of restraining said capsules for travel closely adjacent to said conveyor upon which said pockets are carried.

38. The method defined in claim 37, wherein said step of restraining said capsules includes first restraining them at a distance spaced from said conveyor and subsequently restraining said capsules at a distance closer to the conveyor surface.

39. The method defined in claim 29, including the step of applying a vacuum along the elongated path, through which the vacuum is drawn.

40. The method defined in claim 39, wherein said elongated vacuum extends substantially along the path of movement of said conveyor.

41. In a method of orienting capsules which are randomly arranged in a container, said capsules having body portions and cap portions which are of greater transverse dimension than said body portions, the steps which comprise:

separating the capsules from one another, arranging them in a plurality of spaced apart pockets that are carried by a transport device and positioned in a plurality of adjacent parallel rows thereon and transporting the capsules continuously along a predetermined path while maintaining said rows adjacent and parallel to each other, some with caps-up and some with caps-down, directing a stream of air against the upper portions of the capsules to force those upper portions which are body portions into an attitude generally along the line of said predetermined path, while frictionally restraining substantial movement, along said line, of those capsule upper portions which are cap portions, drawing a vacuum transversely upon all cap portions to draw all capsules to a transverse position with all the cap portions on the same side and, providing shielding means cooperating with the surface of the transport device located between adjacent rows to shield each said row of pockets from rows adjacent thereto during both said air stream directing and said vacuum drawing steps to inhibit stray or eddy currents from developing.

42. An apparatus for printing capsules which are randomly arranged in a container, said capsules having body portions and enlarged cap portions, the combination which comprises:

(a) feed means for separating the capsules from one another and for arranging them on a conveying means in a plurality of spaced-apart rows at substantially equal spacing, with the capsules standing substantially upright;

(b) conveying means for moving said capsules continuously along a predetermined path while maintaining said rows substantially adjacent and parallel to each other;

(c) means directing a stream of air against the upper portions of the capsules to force those upper portions which are body portions into an attitude generally along the line of said predetermined path;

(d) gaging means for substantially limiting such tilting movement of those capsule upper portions which are cap portions;

(e) means for driving said upright cap portions through said gaging means while said capsules remain in an upright position;

(f) means for pulling a vacuum transversely upon all cap portions, downstream of said gaging means, to draw all capsules to a transverse position of rectified orientation with all the cap portions on the same side;

(g) printing means arranged downstream of said vacuum means, and arranged for printing upon the capsules while they are in a rectified orientation, and (h) shielding means cooperating with the conveyor surface located between adjacent rows and located adjacent means (f) to inhibit vacuum currents from being transmitted from one row to rows adjacent thereto.

43. The apparatus defined in claim 42, wherein each row includes a plurality of spaced apart pockets.

44. In an apparatus for orienting and turning capsules having body portions and enlarged cap portions arranged along substantially a common axis, wherein said capsules are continuously movably transported in spaced apart pockets for the capsules, and wherein a plurality of capsules are fed for reception at random, caps-up and caps-down in said pockets, and wherein each said pocket has an upright pocket portion for receiving said capsule therein with the capsule arranged in a substantially upright attitude relative to the direction of capsule movement, each said pocket also having a substantially crosswise pocket portion arranged to carry the capsule in a substantially crosswise attitude relative to the direction of its movement and also substantially crosswise of said upright position, the combination which comprises:

(a) aligning means extending in the transport direction adjacent said pockets in a position to contact said capsules while they are in said upright pocket portions, in a manner to restrain the capsules against movement toward said crosswise pocket portions;

(b) means for gaging said capsule path of movement downstream of said step (a) by interposing into said path an elongated gaging passageway extending in the machine direction, the width of said passageway being greater than the outside diameter of said capsule body portion but lesser than the outside diameter of said capsule cap portion, whereby said cap portions are frictionally engaged by said gaging operation to maintain said caps-up capsules in a caps-up position;

(c) means for tilting the body portions of the caps-down capsules toward the transport direction within said gaging passageway while frictionally engaging the surfaces of said caps-up capsules;

(d) means for driving said caps-up capsules to overcome frictional resistance to move said caps-up capsules along said gaging passageway while maintaining them substantially in a caps-up attitude, and (e) means positioned downstream of said gaging means for causing all of said cap portions that are in an upright attitude and all of said cap portions that are in an attitude extending in transport direction to swing to an attitude in a substantially crosswise direction.

45. The apparatus defined in claim 44, wherein said pockets are arranged in the form of spaced-apart rows extending substantially in the transport direction, and wherein said aligning means (a) comprises a plurality of substantially parallel, elongated guides extending in the machine direction.

46. The apparatus defined in claim 44, wherein said guides are wires.

47. The apparatus defined in claim 44, wherein a plurality of substantially parallel grooves are provided extending in the transport direction between said pockets, and wherein said guides extend through said grooves.

* * * * *